Patented Dec. 19, 1950

2,535,009

UNITED STATES PATENT OFFICE 2,535,009

PROCESS FOR PRODUCING ESTERS OF ALKOXY CARBOXYLIC ACIDS

Willard J. Croxall, Bryn Athyn, and John O. Van Hook, Philadelphia, Pa., assignors to Rohm & Haas Company, Philadelphia, Pa., a corporation of Delaware No Drawing. Application October 2, 1948, Serial No. 52,601

12 Claims. (Cl. 260—484)

This invention deals with transetherifying and transesterifying ether-substituted esters of the formula

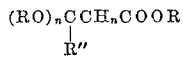

by reacting them with an alcohol, R'OH, in the presence of an anhydrous alkaline catalyst. The compounds which result have the structure

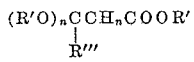

The residue of the alcohol, R', and also the residue R are, broadly, residues of monohydric, non-tertiary alcohols which are free of acidic hydrogen or acidic groups. The symbol R" represents hydrogen or the group —COOR, while R''' represents hydrogen or the group —COOR'. The term $n$ is an integer from one to two inclusive.

As alkaline catalyst, there is used any strongly basic, fixed or non-volatile, alkaline agent which is itself anhydrous and does not develop water by reaction in the process here involved. Probably, the most useful type of alkaline catalyst is an alkali or alkaline earth alcoholate. Other alkaline materials, such as sodium oxide, calcium oxide, sodium amide, sodium hydride, sodium, calcium, and the like, may be regarded as substances which form alcoholates by reaction with an alcohol in the reaction.

The alcohol used to form the alcoholate may desirably correspond to that used in the reaction, but need not necessarily be so. As a matter of convenience, sodium or potassium methylate or ethylate may be used, even though the methyl or ethyl groups do not correspond to any of the alcohol residues present in the reactants. Calcium and magnesium alkoxides, particularly ethylates, are useful catalysts.

Typical alcoholates are sodium methylate, potassium methylate, sodium ethylate, potassium ethylate, sodium isopropoxide, potassium propoxide, sodium butoxide, potassium tert.-butoxide, sodium amylate, sodium 2-ethylbutylate, sodium hexoxide, sodium heptylate, sodium octoate, sodium caprylate, sodium nonylate, sodium isononylate, sodium decylate, sodium dodecylate, potassium cyclohexoxide, potassium methylcyclohexoxide, sodium benzylate, sodium tetrahydrofurfuroxide, calcium butoxide, calcium hexoxide, magnesium propoxide, magnesium butoxide, magnesium hexoxide, magnesium octylate, sodium ethoxyethylate, potassium propoxypropylate, etc.

Only small amounts of alkaline catalyst are needed, amounts of 0.01% to 1% of the weight of the starting ether ester being generally sufficient. Larger amounts may, however, sometimes be used with advantage.

The starting materials are formed by the reaction of acetylene and carbonate esters, $(RO)_2CO$, in the presence of an anhydrous, strongly alkaline catalyst, as described in U. S. application Serial No. 52,607, filed October 2, 1948. Acetylene is run into a mixture of an ester of carbonic acid and catalyst at 20° to 110° C. with or without the presence of an inert organic solvent. The catalyst is destroyed, as by addition of an acidic substance, or is removed by washing and the reaction products isolated. There are obtained beta, beta-di-ether-substituted esters of propionic and succinic acids together with some corresponding beta-ether-substituted acrylates and maleates. The propionates and acrylates may readily be collected in one fraction by distillation and the succinates and maleates in a second fraction or portion. For purposes of the present invention, it is not necessary to separate beta-oxyacrylate from beta,beta-dioxypropionate or oxymaleate from dioxysuccinate, as these monoether esters lead to the same end-products respectively as the diether esters.

The diether propionates and succinates are readily converted into beta-ether acrylates and ether maleates, $ROC(R'')=CHCOOR$, when the former are heated with an alkali metal acid sulfate and one mole of alcohol ROH removed therefrom. The details of this process are presented in U. S. application Serial No. 52,608, filed October 2, 1948. The use of such oxyacrylates or oxymaleates is advantageous when it is desired to dispose of less of the alcohol, ROH, in the course of the reaction with R'OH.

In the reaction of acetylene and carbonate esters there are used as catalysts alkali metal alcoholates, such as lithium methylate, sodium ethylate, potassium butoxide, and the like, alkali metal acetylides, such as sodium acetylide, potassium acetylide, or sodium diacetylide, and strongly basic quaternary ammonium alcoholates, such as tetramethyl ammonium methylate, benzyl trimethyl ammonium ethylate, dibenzyl dimethyl ammonium ethylate, or benzyl triethyl ammonium tert.-butoxide.

The esters of carbonic acid which are useful in the reaction with acetylene have the formula $(RO)_2CO$, where R is a radical of a non-tertiary, monohydric alcohol which is free of acidic hydrogen and groups reacting with a strong alkali.

Outside of this rather evident limitation, the group R may be widely varied. It may be aliphatic, cycloaliphatic, or arylaliphatic. It may be saturated or unsaturated. The attachment of R to oxygen is at a non-tertiary carbon atom thereof; i. e., at a primary or secondary carbon atom. R may be a hydrocarbon group such as methyl, ethyl, isopropyl, propyl, butyl, sec.-butyl, isobutyl, hexyl, octyl, decyl, dodecyl, undecenyl, benzyl, methylbenzyl, tetrahydrobenzyl, endomethylene tetrahydrobenzyl, hexahydrobenzyl, cyclohexyl, methylcyclohexyl, and the like. The hydrocarbon groups should be free of beta,-gamma-unsaturation unless the reaction is carried out below 150° C. It is desirable for practical purposes to limit the diether esters used for the purposes of the present invention to those in which the R group is that of an alcohol, ROH, which boils below 200° C. at 10 mm. and contains not over 18 carbon atoms. It is particularly desirable that R be a hydrocarbon group of one to eight carbon atoms.

The group R is not, however, confined to hydrocarbon groups. It may contain a relatively inert functional group such as ether or thioether. Typical univalent groups for this purpose are ethoxyethyl, methoxyethyl, butoxyethyl, hexoxyethyl, phenoxyethyl, ethoxyethoxyethyl, butoxyethoxyethyl, ethylthioethyl, dimethylaminoethyl, etc.

To illustrate the preparation of beta,beta-diether propionates and diether succinates, there is given the following example of the preparation of these ether esters. The apparatus used for reaction of acetylene and organic carbonate comprised a five-liter flask equipped with a gas-tight stainless steel stirrer, the blades of which scraped the bottom of the flask. For the preparation of the catalyst 225 grams of anhydrous ethyl alcohol was placed in the flask and thereto was gradually added sodium in small cubes until 30 grams of this metal had been used. The sodium was dissolved; the excess alcohol was then evaporated under reduced pressure. The sodium ethylate remained as a dry powder. There was added to the flask at this point 2200 grams of anhydrous diethyl carbonate.

The flask was then equipped with gas inlet and outlet tubes, a manometer, and thermometer. The flask was flushed with nitrogen and heated to about 80° C. Acetylene was passed into the system. This gas was taken from a commercial cylinder but was scrubbed with water and sulfuric acid and was then passed over soda-lime. When the rate of absorption of acetylene became very slow, the flask was cooled and the flow of acetylene was discontinued. Dilute acetic acid was added to the system to destroy the alkaline catalyst. Two layers formed in the flask. The upper, oily layer was separated and fractionally distilled.

A forerun was obtained at normal pressure. It consisted of ethyl alcohol and ethyl carbonate. Distillation was continued under reduced pressure. A fraction was taken off at 65° to 75° C. at 2 to 4 mm. This was found to consist of about 10% of ethyl beta-ethoxyacrylate and 90% of ethyl beta,beta-diethoxypropionate. There was then obtained at 75° C. at 4 mm. a fraction of pure ethyl beta,beta-diethoxypropionate. There was then taken off a fraction between 75° C./4 mm. and 114° C./3 mm. which was a mixture of ethyl beta,beta-diethoxypropionate and diethyl alpha,alpha-diethoxysuccinate. At 114°–115° C./3-4 mm. there was then obtained a fraction consisting of diethyl alpha,alpha-diethoxysuccinate. On further distillation a fraction containing this succinate with some diethyl alpha-ethoxymaleate was obtained.

The beta,beta-diether esters of greatest interest are those in which R is an alkyl group of not over two carbon atoms; i. e., the methyl and ethyl groups. The compounds methyl beta,beta-di(methoxy)propionate, dimethyl alpha,alpha-di(methoxy)succinate, ethyl beta,beta-di(ethoxy)propionate, and diethyl alpha,alpha-di(methoxy)succinate, ethyl beta-ethoxyacrylate, methyl beta-methoxyacrylate, diethyl ethoxymaleate, and dimethyl methoxymaleate are most readily made in good yields and are most economical to use. The alcohols split therefrom are readily volatilized. These diether esters may be summarized by the formula

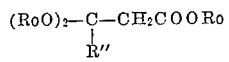

where R'' is hydrogen or the —COOR₀ group, and R₀ is an alkyl group of not over two carbon atoms. The unsaturated esters are of the formula

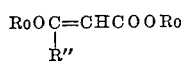

The alcohol R'OH, which in effect displaces the alcohol ROH or R₀OH from ether and ester groupings, is a non-tertiary, monohydric alcohol which like the alcohol ROH is free of acidic hydrogen, of groups reacting with an alkali, and desirably of beta,gamma-acyclic unsaturation. Reactivity of the residue R' with an alkaline hydroxide is a convenient test for eliminating alcohols to be used, since it is, of course, necessary to maintain the reactivity of the alkaline catalysts for the transetherification-transesterification reaction. The alcohol, R'OH, should boil higher than the alcohol ROH which is displaced. With these requirements R' may be a hydrocarbon group, such as propyl, butyl, isobutyl, amyl, hexyl, 2-ethylbutyl, heptyl, octyl, 2-ethylhexyl, nonyl, isononyl, decyl, or dodecyl, or even larger, including cetyl and octadecyl, although groups of not over 12 carbon atoms are of most interest, undecenyl, cyclohexyl, methylcyclohexyl, hexahydrobenzyl, tetrahydrobenzyl, endomethylene tetrahydrobenzyl, benzyl, methylbenzyl, butylbenzyl, and the like. While unsaturated groups may be used for R', it is desirable not to have acyclic unsaturation in the beta,gamma-position. If the unsaturation occurs at this point, then it is desirable to effect the reaction of this invention below 150° C., as can be done, particularly under low pressure. Typical of R' when it contains other than just carbon and hydrogen atoms are methoxyethyl, methoxypropyl, ethoxyethyl, butoxyethyl, butoxypropyl, octoxyethyl, phenoxyethyl, benzoxyethyl, ethoxyethoxyethyl, phenoxyethoxyethyl, octylphenoxyethoxyethyl, ethylthioethyl, dimethylaminoethyl, and the like. Groups for R' with four to twelve carbon atoms appear to be of particular interest in this invention with the R group varying from one to eight carbon atoms.

Excess of the alcohol R'OH over that equivalent to the ether ester is often used. Excess alcohol serves as a solvent, but in place of such a solvent there may be used an inert organic solvent, such as a petroleum naphtha, or an aromatic hydrocarbon, including benzene, toluene, or xylene.

The non-hydroxylated residue of the monohydric alcohol R'OH replaces the R group of the ether esters in both the ether portion and the ester portion. Thus, the compound $$(RO)_2-\underset{R''}{C}-CH_2COOR$$

where R'' is hydrogen or the —COOR group yields theoretically the compound (I) $$(R'O)_2-\underset{R'''}{C}-CH_2COOR'$$

where R''' is hydrogen or the —COOR' group, which compound in turn, when heated in the presence of a strongly alkaline agent with removal of a mole of R'OH, yields (II) $$R'O-\underset{R'''}{C}=CHCOOR'$$

The last compound adds in the presence of an alkaline catalyst a molecule of the alcohol R'OH to form Compound I. If the catalyst is destroyed, Compound I may be readily separated. If distillation is performed in the presence of catalyst, the alcohol R'OH and Compund II are obtained. Thus, the unsaturated esters may be converted to saturated diether esters or the transformed diether esters may be converted to the unsaturated monoether esters. Thus, either Compound I or Compound II, or a mixture thereof, is available depending upon the conditions of reaction and separation.

The reactions between the ester $$(RO)_n\underset{R''}{C}CH_nCOOR$$

and the alcohol R'OH are carried out between 75° C. and 250° C., and preferably at 100° C. to 200° C. The reactions may be effected at normal pressure or at increased or reduced pressures. During the reaction the alcohol ROH, which is formed, is separated, usually by distillation.

The beta-ether acrylates provide two moles of the alcohol ROH, while beta,beta-diether propionates and oxymaleates provide three moles of ROH per mole of ester. The diether succinates yield four moles of alcohol ROH per mole. When the alcohol ROH is displaced in the presence of excess alcohol R'OH, there are formed beta,beta-diether propionates and alpha,alpha-diether succinates. When stoichiometric amounts of R'OH are taken to give the oxyacrylate or oxymaleate or when R'OH is distilled off in the presence of an alkaline catalyst, there are obtained compounds of the formula $$(R'O)C=\underset{R'''}{C}HCOOR'$$

There exist thus equilibria which are controlled by the presence or absence of free alcohol and catalyst. The relations may be summarized thus:

(A)
$$(RO)_2\underset{R''}{C}CH_2COOR \xrightleftharpoons{(cat.)} (RO)\underset{R''}{C}=CHCOOR + ROH$$

$$(cat.) \downarrow +R'OH(-ROH)$$

(B)
$$(R'O)_2\underset{R'''}{C}CH_2COOR' \xrightleftharpoons{(cat.)} (R'O)\underset{R'''}{C}=CHCOOR' + R'OH$$

Removal of the alcohol ROH causes the reaction of Equation A to run to the right. Replacement of ROH by R'OH gives the products of Equation B. If R'OH is present in excess, the reaction of Equation B tends to run to the left, while removal of R'OH causes the reaction to go to the right.

As a variation in the procedures outlined above, the diether saturated esters may be dealcoholated in a separate step and the resulting unsaturated mono-ether transetherified and transesterified with the alcohol R'OH, thus in the presence of an alkaline catalyst $$(RO)_2-\underset{R''}{C}-CH_2COOR$$
$$\downarrow$$
$$RO-\underset{R''}{C}=CHCOOR + ROH$$
$$\downarrow + R+ROH$$
$$R'O-\underset{R'''}{C}=CHCOOR' + ROH$$

When this last ether ester is treated with an alcohol, R+OH there results in the presence of an alkaline catalyst an addition reaction, yielding $$\underset{R+O}{\overset{R'O}{\diagdown}}C-CH_2COOR'$$
$$\diagup$$
$$R'''$$

in accordance with the principles expounded above.

The compounds obtained according to this invention are useful as chemical intermediates, plasticizers, and softeners.

More details of the preparation of transetherified and transesterified ether-esters are shown in the following illustrative examples.

*Example 1*

A mixture of 285 g. (1.5 moles) of ethyl beta,-beta-diethoxypropionate and a solution of 2 grams of sodium in 230 grams (3.1 moles) of n-butanol was heated under a 2-ft. column. The temperature of the reaction mixture varied from 100° C. to 150° C. There was obtained on distillation 207 grams (4.5 moles) of ethanol which distilled with vapor temperatures of 78° C.–80° C. The residue was cooled and poured into ice water. The resulting mixture was acidified. The organic layer was separated, washed with brine, dried over anhydrous magnesium sulfate, and distilled. There was obtained a fraction of 146 grams, which was found to be a mixture of n-butyl beta-n-butoxyacrylate and n-butyl beta,beta-di-n-butoxypropionate which distilled at 103°–124° C./2 mm. This fraction was treated with 0.02 gram of sodium hydrogen sulfate and this mixture was heated in a Claisen flask. There was obtained on distillation 14 grams of n-butanol which distilled at 115° C.–116° C. and 118 grams (39% yield) of n-butyl beta-n-butoxyacrylate which distilled at 113° C./4 mm.–104° C./1 mm. This n-butyl beta-n-butoxyacrylate had a refractive index, $n_D^{20}$, of 1.450, a density, $$d_{20}^{20}$$

of 0.9404, and gave upon analysis a saponification equivalent of 196 and a value for $MR_D$ of 57.30. For n-butyl beta-n-butoxyacrylate ($C_{11}H_{20}O_3$) the saponification equivalent is 200 and $MR_D$ is 55.83.

Repetition of this preparation with methyl beta,beta-(dimethoxy)propionate leads to the identical end-products.

*Example 2*

A mixture of 380 g. (2.00 moles) of ethyl beta,beta-diethoxypropionate, 444 g. (6.0 moles) of sec.-butanol, and a solution of 5 g. of sodium in 50 ml. of ethanol was heated under a 3-ft. column. This reaction mixture was heated to temperatures of 100° C. to 150° C. There was taken off a fraction of 320 cc. of ethanol which distilled at 78°–81° C. The residue was cooled and poured into water. The organic material was removed by extraction with ether. The extracts were washed with brine, dried over a soluble anhydrite drying material, and distilled. After removal of ether, there was obtained 202 g. of sec.-butyl beta-sec.-butoxyacrylate in a 50% yield, which distilled at 90°–95° C./2 mm. and had a refractive index, $n_D^{20}$, of 1.4475. On redistillation the product boiled at 67°–69° C./1 mm., had a refractive index, $n_D^{20}$, of 1.4476 and a density,

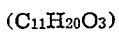

of 0.9390, and gave upon analysis the saponification equivalent of 197, carbon content of 65.96%, hydrogen content of 9.41%, and MR$_D$ of 57.05. For sec.-butyl beta-sec.-butoxyacrylate ($C_{11}H_{20}O_3$)

the saponification equivalent is 200, the carbon content is 65.96%, hydrogen content is 10.07%, and MR$_D$ is 55.83.

Example 3

A mixture of 130 g. (0.7 mole) of ethyl beta,beta-diethoxypropionate, 200 g. (1.54 moles) of 2-ethylhexanol and a solution of 1 g. of sodium in 20 ml. of anhydrous ethanol was heated under a 2-ft. column until 110 g. of ethanol which distilled at 78.5° C. was collected. This reaction mixture was heated to temperatures of 120° C. to 180° C. The residue was cooled, diluted with ether, washed with water until the washings were neutral, dried over anhydrous potassium carbonate, and distilled. After removal of ether there was obtained 52 g. of a mixture of 2-ethylhexanol and 2-ethylhexyl beta-2-ethylhexoxyacrylate which distilled at 45°–100° C./1 mm. and 116 grams of 2-ethylhexyl beta-2-ethylhexoxyacrylate which distilled at 140°–143° C./1 mm., had a refractive index, $n_D^{20}$, of 1.4569, a density,

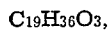

of 0.9157, and gave upon analysis a saponification equivalent of 313, carbon content of 72.84%, hydrogen content of 11.21%, and MR$_D$ of 92.92. For 2-ethylhexyl beta-2-ethylhexoxyacrylate, $C_{19}H_{36}O_3$, the theoretical saponification equivalent is 313, carbon content is 73.02%, hydrogen is 11.61%, and MR$_D$ is 92.7.

Substitution of methyl beta,beta-(dimethoxy)propionate for the above starting diether ester likewise yields 2-ethylhexyl beta-2-ethylhexoxyacrylate.

Example 4

A mixture of 95 grams (0.5 mole) of ethyl beta,beta-diethoxypropionate, 316 g. (2.0 moles) of n-decanol and a solution of 1 g. of sodium in 20 g. of anhydrous ethyl ethanol was heated in a Claisen flask. There was obtained on distillation 88 g. of ethanol which distilled at vapor temperatures of 78°–100° C., while the pot temperature rose to 255° C. The distillation was continued in vacuo. There was obtained 136 g. of unreacted n-decanol which distilled at 90°–99° C./1 mm. and a higher boiling fraction which distilled at 73°–213° C./0.5 mm. and weighed 203 g. After being crystallized from ethanol, it weighed 147 g., melted at 28°–29° C. and gave an analysis for carbon content of 74.99%, for hydrogen content of 11.91% and saponification equivalent of 386. For n-decyl-beta-n-decoxyacrylate ($C_{23}H_{44}O_3$) the theoretical values are carbon content—74.93%, hydrogen content—12.04%, and saponification equivalent—369. The 147 gram fraction represents a yield of 79%.

Example 5

A batch of ethyl beta-beta-diethoxypropionate was heated with 1% of sodium ethylate. After ethanol had been driven off, the batch was distilled at 102°–103° C./34 mm. to give ethyl beta-ethoxyacrylate.

A mixture of 144 g. (1.0 mole) of ethyl beta-ethoxyacrylate, 100 ml. of redistilled xylene, and a solution of 1 gram of sodium in 187 g. (2.1 moles) of dimethyl aminoethanol was heated at 130°–140° C. under a 1-ft. column. There was obtained on distillation 85 g. of ethanol which distilled at vapor temperatures of 78°–79° C. and 30 g. of a mixture of ethanol and xylene which distilled at 79°–125° C. The residue was distilled from a Claisen flask in vacuo. There was obtained 80 g. of xylene which distilled below 45° C./25 mm. and 183 g. of products which distilled at 45° to 140° C./1 mm. The products were fractionally distilled in vacuo through a 1-ft. column. After an 18 g. forerun which distilled below 123° C./1 mm. and which consisted of a mixture of beta-ethoxyacrylate and dimethylaminoethyl beta-dimethylaminoethoxyacrylate, there was obtained 142 g. of dimethylaminoethyl beta-dimethylaminoethoxyacrylate which distilled at 138°–146° C./1 mm., had a refractive index, $n_D^{20}$, of 1.4717, and contained by analysis 12.00% of nitrogen. Theory calculated for dimethylaminoethyl beta-dimethylaminoethoxyacrylate, $C_{11}H_{22}O_3N_2$, gives 12.16% of nitrogen. The 142 gram fraction represents a yield of 62%.

A similar run employing methyl beta-methoxyacrylate as the starting material gave the same end-product in 35% yield.

Example 6

A mixture of 95 g. (0.5 mole) of ethyl beta,beta-diethoxypropionate, 108 g. (1.0 mole) of benzyl alcohol, and a solution of 1 g. of sodium in 20 ml. of anhydrous ethanol was heated under a 1-ft. column. The pot temperatures were 120° to 200° C. There was obtained on distillation 77 g. of ethanol which distilled at 78° C. The residue was diluted with chloroform. The mixture was washed with water and then distilled. After removal of chloroform and water, there was obtained 8 g. of a mixture of ethyl beta-ethoxyacrylate and ethyl beta-benzoxyacrylate which distilled below 97° C./1 mm., 25 g. of ethyl beta-benzoxyacrylate which distilled at 97°–105° C./0.15 mm., had a refractive index, $n_D^{20}$, of 1.5285, and gave by analysis a saponification equivalent of 210, and 89 g. of benzyl beta-benzoxyacrylate which distilled at 140°–198° C./0.1 mm., had a refractive index, $n_D^{20}$, of 1.5678, and gave by analysis a saponification equivalent of 268. For ethyl beta-benzoxyacrylate ($C_{12}H_{14}O_3$) the theoretical saponification equivalent is 206, while for benzyl beta-benzoxyacrylate ($C_{17}H_{16}O_3$) the theoretical saponification equivalent is 268.

Example 7

A mixture of 95 g. (0.5 mole) of ethyl beta,beta-diethoxypropionate, 200 g. (2.0 moles) of cyclohexanol, and a solution of 2 g. of sodium in 30 g. of anhydrous ethanol was heated in a Claisen flask at 120° to 200° C. There was obtained on distillation 97 g. of ethanol which distilled at 83°–85° C. and had a refractive index, $n_D^{20}$, of 1.3650. The residue was added to a solution of 1 g. of sodium in 50 g. (0.5 mole) of cyclohexanol. The mixture was allowed to stand for 63 hours and was then poured into water. The organic material was extracted with ethylene dichloride, washed with water until the washings were neutral, dried over activated calcium sulfate, and distilled. There was obtained 70 g. of unreacted cyclohexanol which distilled at 48°–64° C./0.7 mm. and had a refractive index, $n_D^{20}$, of 1.4660, 43 g. of a mixture of cyclohexanol and cyclohexyl beta,beta-di-cyclohexoxypropionate which distilled at 64°–173° C./1 mm. and 90 g. of cyclohexyl beta,beta-dicyclohexoxypropionate which distilled at 173°–190° C./0.6 mm., had a refractive index, $n_D^{20}$, of 1.4838, and gave upon analysis a saponification equivalent of 342. Cyclohexyl beta,beta-dicyclohexoxypropionate ($C_{21}H_{38}O_4$) has a theoretical saponification equivalent of 334.

Example 8

A mixture of 95 g. (0.5 mole) of ethyl beta,beta-diethoxypropionate, 260 g. (2.0 moles) of 2-ethylhexanol, and a solution of 2 g. of sodium in 30 g. of anhydrous ethanol was heated in a Claisen flask at 120° to 180° C. There was taken off 95 g. of ethanol which distilled at 80°–93° C. To the residue was added a solution of 1 g. of sodium in 65 g. (0.5 mole) of 2-ethylhexanol. The mixture, protected from the atmosphere by a tube containing anhydrous calcium chloride, was allowed to stand overnight and was then washed with water until the washings were neutral. The organic layer was dried over activated calcium sulfate and distilled. There was obtained 129 g. of unreacted 2-ethylhexanol which distilled at 48°–135° C./0.3 mm., 10 g. of a mixture of 2-ethylhexanol and 2-ethylhexyl beta,beta-di-(2-ethylhexoxy)propionate which distilled at 135°–168° C./0.3 mm. and 189 g. (86% yield) of 2-ethylhexyl beta,beta-di-(2-ethylhexoxy)propionate which distilled at 168°–176° C./0.3 mm., had a refractive index, $n_D^{20}$, of 1.4460 and gave by analysis a saponification equivalent of 412. For 2-ethylhexyl beta,beta-di-(2-ethylhexoxy)propionate ($C_{27}H_{54}O_4$) the theoretical saponification equivalent is 443.

Example 9

A mixture of 190 g. (1.0 mole) of ethyl beta,beta-diethoxypropionate, 296 g. (4.0 moles) of n-butanol, and magnesium n-butoxide prepared from 3 g. of magnesium was heated under a 2-ft., packed column. There was taken off 135 g. of ethanol which distilled at 78°–81° C. while the pot temperature rose from 121°–154° C. and 60 g. of unreacted n-butanol which distilled at 40°–50° C./50 mm. The cooled residue was diluted with ether, washed with aqueous acid and then with water until the washings were neutral, dried over anhydrous calcium sulfate and distilled. After removal of ether there was obtained 21 g. of a mixture of ethyl beta-ethoxyacrylate and butyl beta-butoxyacrylate which distilled at 32°–112° C./0.4 mm. and had a refractive index, $n_D^{20}$, of 1.4480, 131 g. of a mixture of 28% butyl beta-butoxyacrylate and 72% butyl beta,beta-di(butoxy)propionate (as estimated from refractive index) which distilled at 112°–121° C./0.5 mm. and had a refractive index, $n_D^{20}$, of 1.4344, and 87 g. of butyl beta,beta-dibutoxypropionate which distilled at 121°–125° C./0.6 mm. and had a refractive index, $n_D^{20}$, of 1.4282.

Example 10

A mixture of 262 g. (1.0 mole) of diethyl alpha,alpha-diethoxysuccinate, 585 g. (8.0 moles) of n-butanol, and magnesium butoxide prepared from 3 g. of magnesium was heated under a 2-ft. column. The pot temperature was 110° to 140° C. There was obtained on fractional distillation 177 g. of ethanol which distilled at 78°–94° C. and 272 g. of unreacted butanol which distilled below 40° C./40 mm. The cooled residue was made neutral by addition of dilute hydrochloric acid, washed with water, dried over activated calcium sulfate, and distilled from a Claisen flask in vacuo. There was taken off 332 g. of dibutyl alpha,alpha-dibutoxysuccinate which distilled at 159° C./1 mm., had a refractive index, $n_D^{20}$, of 1.4409, and gave upon analysis a saponification equivalent of 182. The theoretical saponification equivalent for dibutyl alpha,alpha-dibutoxysuccinate ($C_{20}H_{38}O_6$) is 187. The 332 gram fraction of product represents a yield of 88%.

A similar reaction employing dimethyl alpha,alpha-dimethoxysuccinate as the starting material gave the desired product in 66% yield.

Example 11

A mixture of 262 g. (1.0 mole) of ethyl alpha,alpha-diethoxysuccinate, 370 g. (5.0 moles) of n-butanol, and sodium butoxide prepared from 4 g. of sodium was heated under a 2-ft. column. The pot temperature was 110° C. to 140° C. There was taken off 229 g. of ethanol which distilled at 78°–80° C. The residue was cooled, mixed with a solution of 1 g. of sodium in 74 g. of butanol and allowed to stand 18 hours. The mixture was washed with water until neutral, dried over activated calcium sulfate, and distilled through a 1-ft. column in vacuo. There was obtained 91 g. of unreacted butanol which distilled at 36°–59° C./15 mm., 7 g. of unreacted diethyl alpha,alpha-diethoxysuccinate which distilled at 92° C. mm. and had a refractive index, $n_D^{20}$, of 1.4320 and 175 g. of dibutyl alpha,alpha-dibutoxysuccinate which distilled at 147°–155° C./0.8 mm. and had a refractive index, $n_D^{20}$, of 1.4412. The 175 gram fraction represents a yield of 47%.

The substitution of diethyl ethoxymaleate for the diethyl diethoxysuccinate yields the same end-products as in the example above. Likewise, there may be used a mixture of diethyl diethoxysuccinate and ethoxymaleate with the same end result.

Substitution of the diethyl alpha,alpha-diethylsuccinate with its methyl analogue does not alter the results of the procedure, there being then taken off methyl alcohol in place of the ethanol. Dibutyl dibutoxysuccinate is obtained as the final product.

Example 12

A mixture of 131 g. (0.5 mole) of ethyl alpha,alpha-diethoxysuccinate, 255 g. (2.5 moles) of 2-ethylbutanol, and magnesium 2-ethyl butoxide prepared from 2 g. of magnesium was heated in a Claisen flask. There was taken off 92 g. of ethanol which distilled at 78°–85° C. while the pot temperature rose to 210° C., and 69 g. of excess 2-ethylbutanol which distilled at 49°–52° C./10 mm. and had a refractive index, $n_D^{20}$, of 1.4209. The residue (230 g.) was subjected to distillation in a high vacuum, short pass, falling film still. There was obtained 146 g. of a mixture of 66% of di(2-ethylbutyl) alpha,alpha-di-(2-ethylbutoxy)succinate and 34% of di-(2-ethylbutyl) alpha-(2-ethylbutoxy)maleate which distilled below 138° C./10 mm., had a refractive index, $n_D^{20}$, of 1.4531, a density,

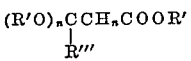

of 0.9629 and gave upon analysis a saponification equivalent of 222. For di(2-ethylbutyl) alpha,alpha - di - (2 - ethylbutoxy)succinate ($C_{28}H_{55}O_6$) the theoretical saponification equivalent is 243; for di(2-ethylbutyl) alpha,alpha-(2-ethylbutoxy)maleate ($C_{22}H_{41}O_5$) it is 193.

*Example 13*

A mixture of 131 g. (0.5 mole) of diethyl alpha,alpha-diethoxysuccinate, 325 g. (2.5 moles) of 2-ethylhexanol, and magnesium 2-ethylhexoxide prepared from 3 g. of magnesium was stirred and heated in a Claisen flask. There was obtained 89 g. of ethanol, which distilled at 70°–85° C. while the pot temperature rose from 140°–238° C., and 28 g. of 2-ethylhexanol which distilled at 50° C./1 mm. The cooled residue was diluted with ether, washed with dilute aqueous hydrochloric acid and then with water until the washings were neutral, dried over anhydrous calcium sulfate and distilled from a Claisen flask. After removal of ether there was obtained 48 g. of 2-ethylhexanol which distilled at 58°–60° C./1 mm. and had a refractive index, $n_D^{20}$, of 1.4290. The residue (237 g.) was subjected to distillation in a high vacuum, short pass, falling film still. After an eight-gram forerun which distilled below 118° C./40 mm. and which consisted largely of 2-ethylhexanol, there was obtained 134 g. of a mixture of 67% of di-(2-ethylhexyl) alpha,alpha - di-(2-ethylhexoxy)succinate and 33% of di(2-ethylhexyl) (2-ethylhexoxy)maleate which distilled at 148° C./20 mm., had a refractive index, $n_D^{20}$, of 1.4551, and gave upon analysis a saponification equivalent of 274. For di(2-ethylhexyl) alpha,alpha-di-(2-ethylhexoxy)succinate ($C_{36}H_{70}O_6$) the theoretical saponification equivalent is 299; for di(2-ethylhexyl) (2-ethylhexoxy)maleate ($C_{28}H_{52}O_5$) it is 234. Material left in the still, principally as "hold up," weighed 41 grams.

*Example 14*

A mixture of 105 g. (0.4 mole) of diethyl alpha,alpha-diethoxysuccinate, 236 g. (2.0 moles) of 2-tert.-butoxyethanol, and magnesium 2-tert.-butoxyethoxide prepared from 2 g. of magnesium was heated in a Claisen flask. There was taken off 73 g. of ethanol which distilled at 75°–78° C. while the pot temperature rose from 150°–183° C. Glacial acetic acid (10 g.) was added to the residue and the distillation was continued in vacuo. There was obtained 79 g. of 2-tert.-butoxyethanol which distilled at 52° C./8 mm. to 53° C./2 mm. and had a refractive index, $n_D^{20}$, of 1.4150, 20 g. of a mixture of 2-tert.-butoxyethanol and di(2-tert.-butoxyethyl) alpha,alpha-di(2-tert.-butoxyethoxy)succinate which distilled at 53°–187° C./2 mm., and 143 g. of di(2-tert.-butoxyethyl) alpha,alpha-di(2-tert. - butoxyethoxy)succinate which distilled at 187°–195° C./2 mm. and had a refractive index, $n_D^{20}$, of 1.4489. On redistillation the product boiled at 184°–198° C./0.2 mm., had a refractive index, $n_D^{20}$, of 1.4540, a density,

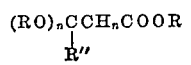

of 1.023, and gave upon analysis a saponification equivalent of 222, carbon content of 60.94%, hydrogen content of 9.42%, $MR_D$ of 114.40. For di(2-tert.-butoxyethyl) alpha - (2 - tert.-butoxyethoxy)maleate ($C_{22}H_{40}O_8$) the theoretical values are: Saponification equivalent, 216; carbon content, 61.11%; hydrogen content, 9.26%, $MR_D$ 113.21.

We claim:

1. The process of preparing an ether ester of the formula

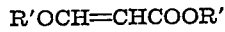

which comprises reacting a compound of the formula

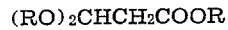

with an alcohol R'OH by heating them together between 75° C. and 250° C. in the presence of an anhydrous, fixed, strongly alkaline catalyst and separating the alcohol ROH from the reaction mixture, n representing an integer from one to two, R'' representing a member of the class consisting of hydrogen and the —COOR group, R''' representing a member of the class consisting of hydrogen and the —COOR' group, R and R' representing the residues of neutral, non-tertiary, monohydric alcohols which residues are free of acidic hydrogen and groups reacting with strong alkali, the alcohol R'OH boiling higher than the alcohol ROH and the latter boiling below 200° C. at 10 mm.

2. The process of preparing ether esters of the formula

R'OCH=CHCOOR' which comprises reacting the diether ester (RO)$_2$CHCH$_2$COOR with an alcohol R'OH by heating them together between 75° C. and 250° C. in the presence of an anhydrous, fixed, strongly alkaline catalyst and separating the alcohol ROH therefrom, in the above formulae R and R' representing residues of non-tertiary monohydric alcohols, the non-hydroxylated residues of which are free of acidic hydrogen and groups reacting with a strong alkali, the alcohol R'OH boiling higher than the alcohol ROH and the alcohol ROH boiling below 200° C. at 10 mm.

3. The process of claim 2 in which R and R' are saturated hydrocarbon groups.

4. The process of claim 2 in which R is an alkyl group of not over two carbon atoms and R' is a hydrocarbon group.

5. The process of preparing ether esters of the formula (R'O)$_2$CHCH$_2$COOR' which comprises reacting the diether ester (RO)$_2$CHCH$_2$COOR with an excess of the alcohol R'OH by heating them together between 75° C. and 250° C. in the presence of an anhydrous, fixed, strongly alkaline catalyst, separating the alcohol ROH from the reaction mixture, and destroying the catalyst, R and R' representing saturated hydrocarbon residues of monohydric, non-tertiary alcohols, the alcohol R'OH boiling higher than the alcohol ROH and the latter boiling below 200° C. at 10 mm.

6. The process of claim 5 in which the group R is an alkyl group of not over two carbon atoms.

7. The process which comprises reacting at least three molecular proportions of an alcohol R'OH and one molecular proportion of ethyl beta,beta-diethoxypropionate by heating said reactants together at 100° C. to 200° C. in the presence of an anhydrous, fixed alkaline catalyst, separating ethyl alcohol from the reaction mixture, destroying the catalyst, and separating the ether ester $$(R'O)_2CHCH_2COOR'$$

R' representing the saturated hydrocarbon residue of a non-tertiary, monohydric alcohol which boils above ethyl alcohol and which contains not over 18 carbon atoms.

8. The process which comprises reacting at least two molecular proportions of an alcohol R'OH and one molecular proportion of ethyl beta,beta-diethoxypropionate by heating said reactants together at 100° C. to 200° C. in the presence of an anhydrous, fixed, alkaline catalyst, separating ethyl alcohol from the reaction mixture, volatilizing from the reaction mixture by heating any excess of R'OH above the two mole proportion, and separating an ether ester $$R'OCH=CHCOOR'$$

R' representing in the above formulae the saturated hydrocarbon residue of a non-tertiary, monohydric alcohol which boils above ethyl alcohol and which contains not over 18 carbon atoms.

9. The process of preparing ether esters of the formula $$(R'O)_nCCH_nCOOR'$$
$$\quad\quad\quad\;|$$
$$\quad\quad\quad R'''$$

which comprises reacting a compound of the formula $$(RO)_nCCH_nCOOR$$
$$\quad\quad\quad|$$
$$\quad\quad\quad R''$$

with an alcohol R'OH by heating them together between 75° C. and 250° C. in the presence of an anhydrous, fixed, strongly alkaline catalyst and separating the alcohol ROH from the reaction mixture, $n$ representing an integer from one to two, R'' representing a member of the class consisting of hydrogen and the —COOR group, R''' representing a member of the class consisting of hydrogen and the —COOR' group, R representing an alkyl group of not over two carbon atoms and R' representing a saturated hydrocarbon group of four to twelve carbon atoms.

10. The process of preparing ether esters of the formula $$(R'O)_nCHCH_nCOOR'$$

which comprises reacting the diether ester $$(RO)_nCHCH_nCOOR$$

with an excess of the alcohol R'OH by heating them together between 75° C. and 250° C. in the presence of an anhydrous, fixed, strongly alkaline catalyst, separating the alcohol ROH from the reaction mixture, and destroying the catalyst, R representing an alkyl group of not over two carbon atoms, R' representing a saturated hydrocarbon group of four to twelve carbon atoms, and $n$ representing an integer from one to two.

11. The process of preparing ether esters of the formula $$R'OCH=CHCOOR'$$

which comprises reacting a compound of the formula $$(RO)_nCHCH_nCOOR$$

with two moles of an alchol R'OH per mole of said compound by heating them together between 75° C. and 250° C. in the presence of an anhydrous, fixed, strongly alkaline catalyst and separating $n+1$ moles of the alcohol ROH therefrom per mole of said compound, $n$ representing an integer from one to two, R representing an alkyl group of not over two carbon atoms, and R' representing a saturated hydrocarbon group of four to twelve carbon atoms.

12. The process of preparing ether esters of the formula $$(R'O)_2CHCH_2COOR'$$

which comprises reacting one mole of a compound of the formula $$(RO)_nCHCH_nCOOR$$

with at least three moles of an alcohol R'OH by heating them together between 75° C. and 250° C. in the presence of an anhydrous, fixed, strongly alkaline catalyst, separating the alcohol ROH therefrom and destroying the catalyst, $n$ representing an integer from one to two, R representing an alkyl group of not over two carbon atoms, and R' representing a saturated hydrocarbon group of four to twelve carbon atoms.

WILLARD J. CROXALL.
JOHN O. VAN HOOK.

No references cited.